United States Patent [19]

Kurosu et al.

[11] Patent Number: 5,608,858
[45] Date of Patent: Mar. 4, 1997

[54] METHOD AND SYSTEM FOR REGISTERING AND FILING IMAGE DATA

[75] Inventors: Yasuo Kurosu, Yokosuka; Seiichi Kanema; Hitoshi Tachi, both of Yokohama; Hajime Uchiyama; Masahiro Okumura, both of Odawara; Masaaki Fujinawa, Hinode-machi; Naoaki Kubushiro, Minamiashigara; Hirowo Shimizu, Kumagaya, all of Japan

[73] Assignees: Hitachi, Ltd., Tokyo; Hitachi Microsoftware Systems, Inc., Kanagawa-ken, both of Japan

[21] Appl. No.: 430,827

[22] Filed: Apr. 28, 1995

Related U.S. Application Data

[63] Continuation of Ser. No. 17,999, Feb. 16, 1993, Pat. No. 5,428,727, which is a continuation of Ser. No. 469,383, Jan. 24, 1990, abandoned.

[30]    Foreign Application Priority Data

Jan. 27, 1989  [JP]  Japan .................................. 1-16146

[51] Int. Cl.$^6$ .................................................. G06T 1/00
[52] U.S. Cl. .......................... 395/763; 395/326; 395/348; 395/964
[58] Field of Search ..................... 395/145–149, 395/155–161, 162–164, 600

[56]    References Cited

U.S. PATENT DOCUMENTS

5,179,658   1/1993   Izawa et al. .......................... 395/164

*Primary Examiner*—Almis R. Jankus
*Attorney, Agent, or Firm*—Antonelli, Terry, Stout & Kraus

[57]    ABSTRACT

Disclosed herein is a system integrally comprising a CAD system and an electronic filing system. When vector data such as figures and their names are converted to image (raster) data for storage, the system automatically extracts, from the vector data coming from the CAD system, those data that correspond to predetermined character attributes, maximum numeric attributes, primitives of each figure and the topology thereof. The data are set as key-words and are made to correspond to the image data for registration and storage into the electronic filing system. In searching for desired image data, the corresponding key-words are input for data retrieval and output.

15 Claims, 8 Drawing Sheets

| ATTRIBUTE | FIGURE ATTRIBUTE | COORDINATE 1 | COORDINATE 2 | VALUE |
|---|---|---|---|---|
| NUMERAL | — | x0, y0 | x'0, y'0 | M |
| CONTINUOUS LINE | CIRCLE | x1, y1 | x'1, y'1 | n1 |
| CONTINUOUS LINE | — | x2, y2 | x'2, y'2 | — |
| CONTINUOUS LINE | RECTANGLE | x3, y3 | x'3, y'3 | — |
| CONTINUOUS LINE | — | x4, y4 | x'4, y'4 | — |
| CHARACTER | — | x5, y5 | x'5, y'5 | YAMADA |
| CHARACTER | — | x6, y6 | x'6, y'6 | OHTA |
| CONTINUOUS LINE | CIRCLE | x7, y7 | x'7, y'7 | n2 |
| CHARACTER | — | x8, y8 | x'8, y'8 | JOINING PART |
| NUMERAL | — | x9, y9 | x'9, y'9 | N |
| ⋮ | ⋮ | ⋮ | ⋮ | ⋮ |

NOTE) "———" IN THE FIGURE ATTRIBUTE CORRESPONDING TO "CONTINUOUS LINE" MEANS A STRAIGHT LINE, AND OTHERS MEANS NO VALUES.

| ICON CODE | TOPOLOGY INFORMATION | IMAGE INFORMATION | AUXILIARY INFORMATION |
|---|---|---|---|
| 1 | RECTANGLE ↑ CIRCLE | a0, s0 | — |
| 2 | CIRCLE→RECTANGLE→CIRCLE | a1, s1 | f0 |
| 3 | CIRCLE | a2, s2 | f1 |
| ⋮ | ⋮ | ⋮ | ⋮ |

METHOD AND SYSTEM FOR REGISTERING AND FILING IMAGE DATA

This is a continuation of application Ser. No. 08/017,999, filed Feb. 16, 1993, now U.S. Pat. No. 5,428,727; which is a Continuation of application Ser. No. 07/469,383, filed on Jan. 24, 1990, now abandoned.

BACKGROUND OF THE INVENTION

The present invention relates to an electronic filing system to which a computer aided design (CAD) system or the like is connected and, more particularly, to a method and a system for registering and filing image data whereby any desired portion of image data generated by the CAD system is electronically filed, searched for and extracted automatically through the use of key-words.

In recent years, the electronic filing system has been the newest arrival on the scene of office automation (OA) following the word processor, personal computer and facsimile machine. This newcomer is capable of storing huge amounts of documents and drawings in the form of image data on disks in their drives. The electronic filing system admits source drawings from a scanner, converts them to electronic image data, and stores page after page of the image data on optical disks or similar means. As required, the system retrieves desired portions of the image data and displays or prints them out.

In searching for any portion of image data, the simplest method would be to display and visually verify the data from the first page on through retrieval from disks. The most serious drawback to this method was the obviously low efficiency of the search, evidenced by the uncertainty of when the desired image data is reached and displayed or otherwise output. A widely deployed prior art solution to this problem has been to add key-words to image data as they are registered, the key-words indicating the contents of the data they are attached to. In operation, the desired portion of the image data is searched for by use of the corresponding key-word. Generally, where the image data involve documents, important words or pieces of wording are picked up therefrom and are assigned and input as key-words to the respective portions of the suitably filed data. Where drawings are included, they are identified by drawing names or other appropriate pieces of wording which are input as key-words indicating the contents of the drawings selected. These key-words may be defined as character key-words as opposed to what is proposed below in this specification.

A distinct drawback to the use of character key-words has been that they may not fully express what each drawing or figures therein graphically represent. Another drawback has been that the character key-words are bothersome and difficult to enter from an input device. So another solution to the problem of searching for graphic elements was proposed. This method, disclosed in Japanese Patent Laid-open No. 60-83179, involves the use of key-words graphically representing the characteristic of each figure being filed.

The method is embodied in part by an input and a display device, the input device reading source drawings and the display device outputting the data that were read. The contour of each figure is traced manually by a pointing device (mouse, tablet, etc.). The traced figure is reduced in size and used as a key-word. Because the reduced graphic form is generated by extracting the characteristics of the image it represents, it is easy for the operator to distinguish one reduced figure from another. Thanks to the reduction, a large number of key-words may be displayed simultaneously on a key-word display screen of the display device. When any of the reduced graphic forms on display is picked by the pointing device, the corresponding image data is read from the optical disk for display.

The prior art method outlined above allows figures to be defined as key-words. The operator may use desired external form patterns according to his or her liking as key-words. This feature makes it easier to search optical disks of huge capacities for target images.

The above-mentioned prior art method has significantly improved the efficiency in searching for desired image data. However, there has still remained the bothersome task of having to register the key-words, be they graphic or in character.

In generating external form key-words, the operator must trace the contour of each of the figures entered using the pointing device. Thus the task of registering page after page of image data has consumed inordinate amounts of time.

In generating character key-words, the operator must pick up and manually input suitable words or pieces of wording from the images to be registered. In addition, there are often required not one but a plurality of key-words to one figure for clarification purposes. This requirement has further exacerbated the situation where it takes many man-hours to accomplish the image data registration.

Other prior art methods related to this area include ones disclosed in Japanese Patent Laid-open Nos. 62-72067 and 62-93757.

SUMMARY OF THE INVENTION

It is therefore an object of the present invention to provide a method and a system for registering and filing image data, the method and the system constituting a filing system connected to a CAD system or the like. When the CAD system generates vector data, the filing system accordingly generates character and/or external form key-words for use with image data based on the vector data, and automatically registers the image data by use of the key-words.

It is another object of the present invention to provide a method and a system for registering and filing image data whereby received vector data are converted to raster data to which character and/or external form key-words are assigned for automatic image data registration.

It is still another object of the present invention to provide a method and a system for registering and and filing image data whereby vector data are received and converted to raster data for storage into an electronic filing system. While being stored into the electronic filing system, the raster data are automatically assigned key-words for subsequent search and retrieval.

According to one aspect of the present invention, there is provided an arrangement whereby vector data such as figures are received and converted to image (raster) data. From the vector data, key-words corresponding to the attributes selected are extracted; the key-words are registered together with the image data for subsequent search and retrieval.

According to another aspect of the present invention, there is provided an electronic filing system to which is connected a CAD system generating vector data of figures. A vector-to-raster (image) converter is installed in the electronic filing system. The converter comprises means for automatically extracting key-words from the vector data generated by the CAD system. The extracting means takes advantage of the fact that vector data are made up of such attributes as line types, numeric codes and coordinate values. That is, attributes that adequately represent the characteristics of the figures generated are extracted from the vector data and established beforehand as key-words.

More specifically, the vector-raster converter comprises five kinds of means: (1) means for extracting a file name to be registered, (2) means for extracting a title column of a drawing according to predetermined format information, (3) means for extracting the longest numeric code for a figure in a drawing, (4) means for extracting primitives of each figure and the topology thereof, i.e., a relative positional relationship between major primitives (basic graphic parts) making up the figure, and (5) means for extracting continuous line information representing external forms of vector data, for reducing the information to a predetermined expansion factor, and for extracting from already registered icons the icon code whose degree of similarity to the selected topology is the highest. These means make it possible to automatically extract the appropriate key-words and register them in the electronic filing system together with the converted image data.

In the setup described above, the vector-raster converter is located inside the electronic filing system. Alternatively, the converter may be placed inside the CAD system or between the CAD system and the electronic filing system. According to the present invention, vector data (files) such as figures to be input constitute code information that includes both the vector data to be converted by the converter to raster data and the data to be left unconverted.

According to still another aspect of the present invention, there is provided a vector-raster converter in any of three locations: inside an electronic filing system to which is connected a CAD system or the like generating vector data, between the electronic filing system and the CAD system, or inside the CAD system or the like. The vector-raster converter converts vector data coming from the CAD system into raster data for use by the electronic filing system. At the converting stage, the code information provided by the vector data is utilized to embody the above-described five means.

The first means extracts as a key-word a file name that is sent by the vector generating device to the electronic filing system upon registering image data.

The second means extracts character attribute data from the code information of the vector data so as to generate as a key-word that character code of the code information which falls within the coordinate value previously supplied.

The third means extracts as a key-word the longest code for figures in a drawing as follows: Numeric attributes of the code information are selected and compared in the vertical and horizontal direction before the longest size is picked up. The selected numeric code is used as the key-word.

The fourth means, as described earlier, extracts primitives of a figure and the topology thereof. The fifth means extracts line type attributes of the code information provided by the vector data in order to find from among reduced graphic forms the icon code whose degree of similarity to the selected topology is the highest. Either of these two means receives from the CAD system or the like the vector data that were sorted from a given point of coordinates. All line type attributes of the code information provided by the vector data are extracted, and the extracted vector data are classified into unit graphic forms. From the graphic forms this classified, there is selected the largest graphic form that provides an external form. Given the external form, the fourth means extracts major primitives therefrom. Since the code information is sorted from a given coordinate point, the consecutively extracted primitives are fixed in their relative positional relationship to one another. This provides a topology of the primitives. The fifth means utilizes the topology in order to determine if there exists an icon code whose similarity to the extracted figure is close enough. This process is made possible because auxiliary information for icon codes contains icon code topologies. If there is an icon code whose topology matches that of the figure, the similarity allows the icon code to be set as the key-word. If there is no icon code having a topology of sufficient similarity, the extracted figure is reduced to a predetermined size and registered anew.

Figure 1:
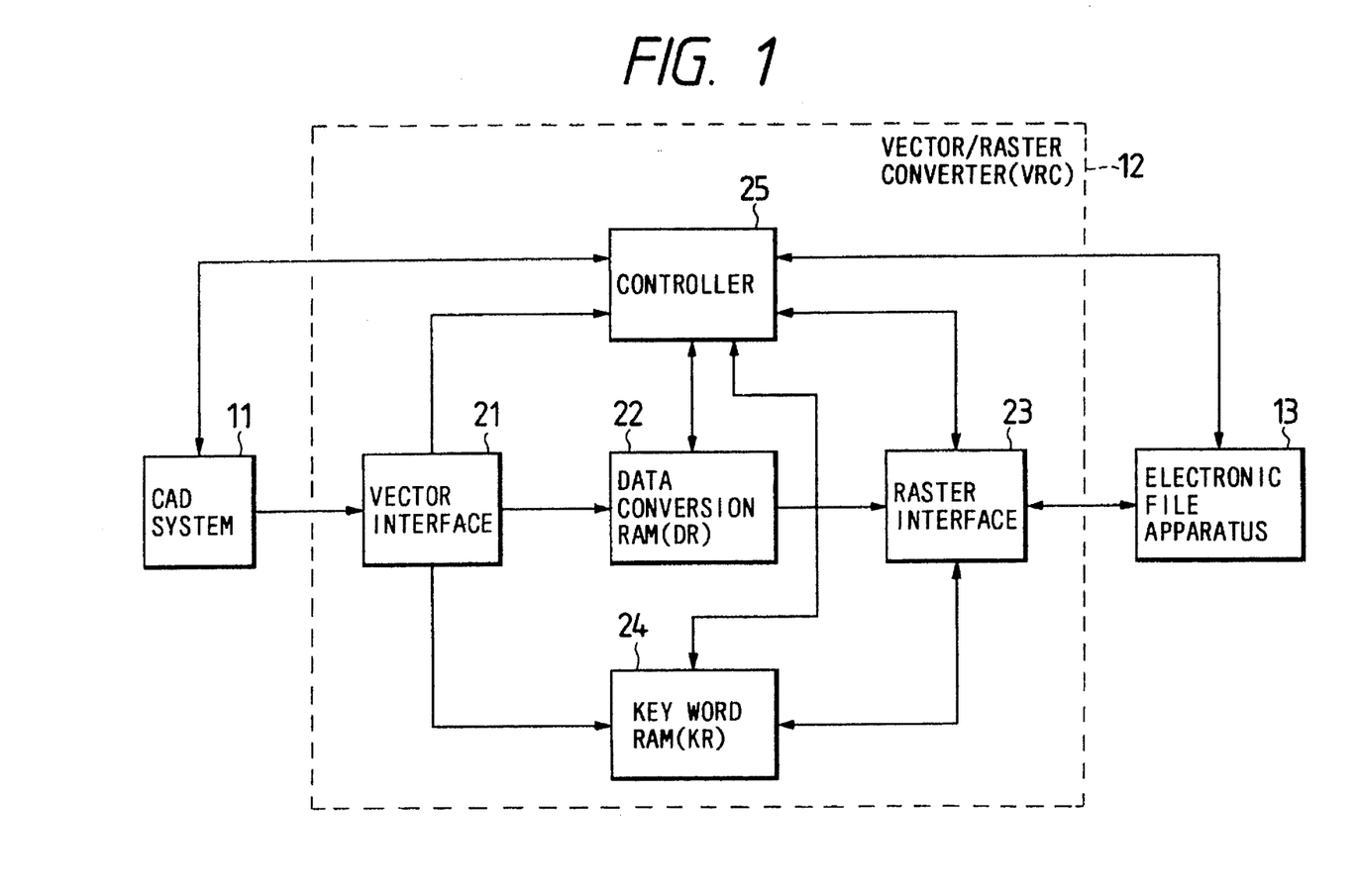
FIG. 1 is a schematic block diagram showing an embodiment of a system for registering image data according to the present invention.
Figure 4:
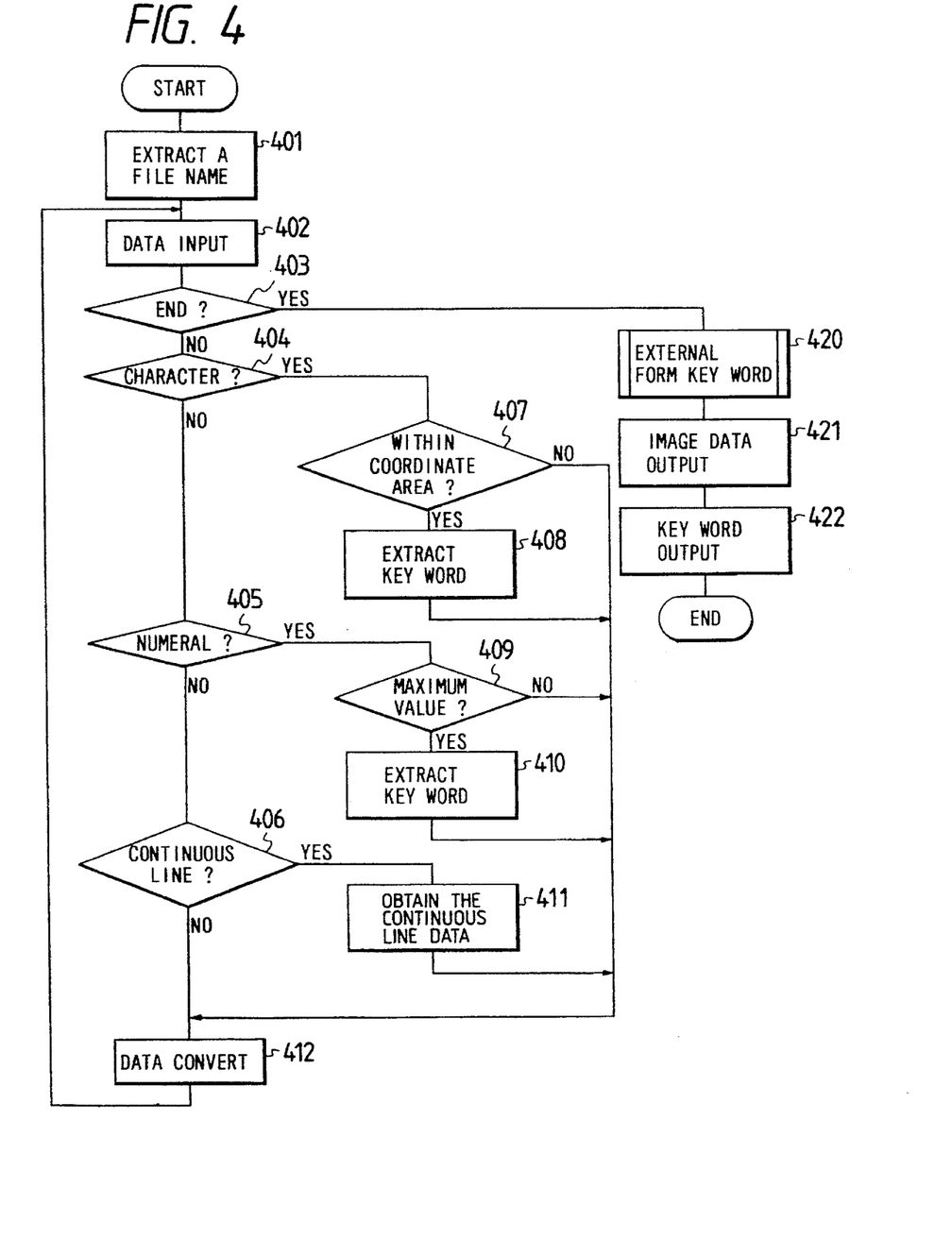
FIG. 4 a flowchart showing a typical flow of operations performed by the embodiment of FIG. 1.

DESCRIPTION OF THE PREFERRED EMBODIMENTS:

There will now be described an embodiment of the present invention by referring to FIG. 1. FIG. 1 shows conceptually how the embodiment is constructed. FIG. 4 depicts the flow of the operations carried out by this embodiment.

Referring to FIG. 1, there are provided a CAD system 11 that outputs vector data, a vector-raster converter (also called a data converter) 12 capable of extracting key-words from the vector data, and an electronic filing system 13 that stores and keeps image data. The data converter 12 comprises a vector interface 21 that receives data from the CAD system 11; a data conversion RAM (called the DR) 22 that converts the vector data received via the vector interface 21 into raster data for storage; a raster interface 23 that sends image data along with the key-words thereof to the electronic filing system 13 after data conversion; a key-word RAM (called the KR) 24 that stores the extracted key-words; and a controller 25 that controls the data converter 12 to convert the vector data to raster data.

Figure 2:
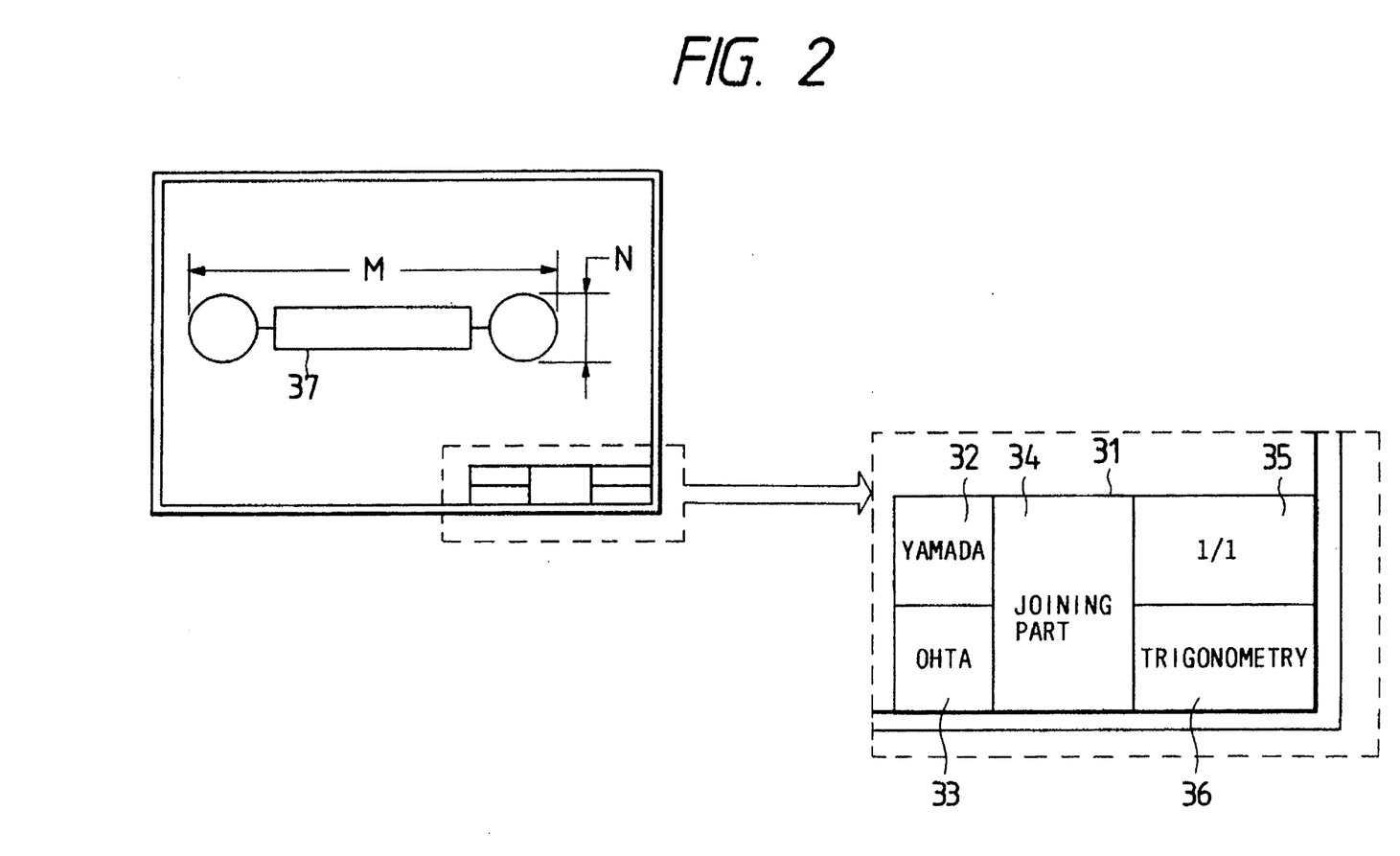
FIG. 2 is a view depicting a typical screen to be registered by the embodiment of FIG. 1.
Figure 3:
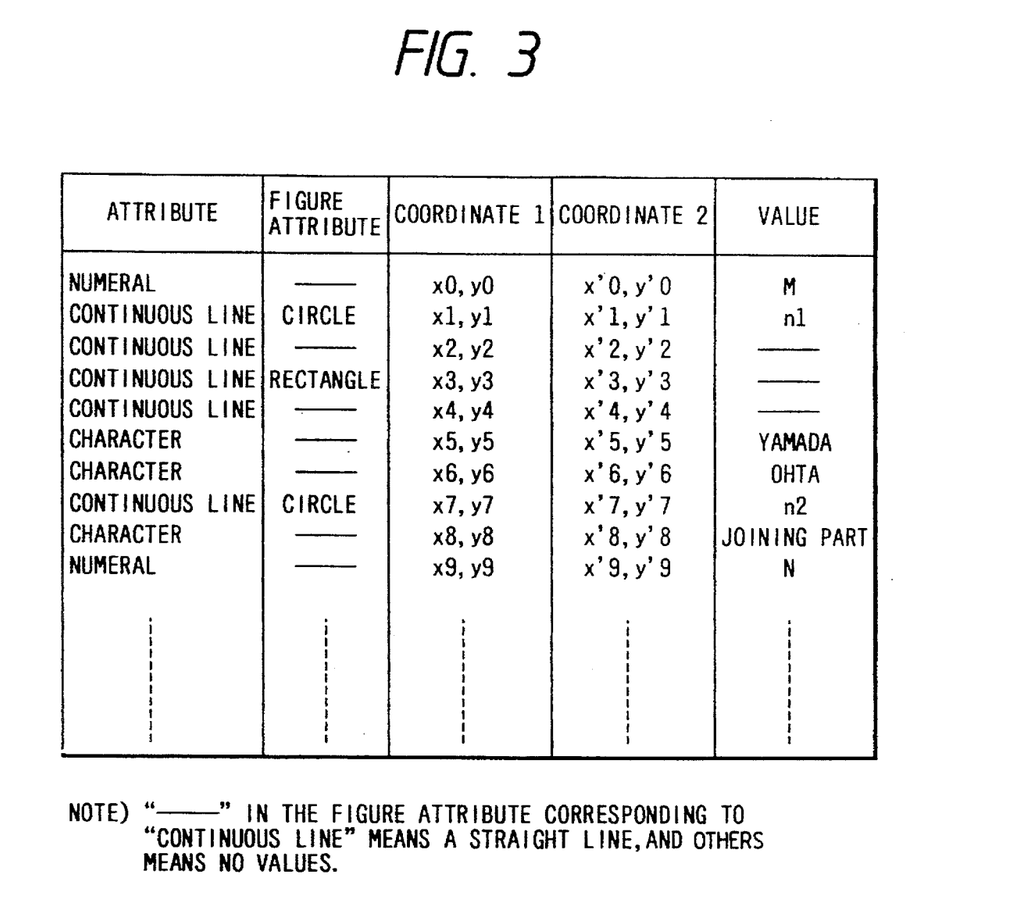
FIG. 3 is a view illustrating vector data for use in the screen of FIG. 2.

FIG. 2 shows a typical screen generated by the CAD system 11. FIG. 3 illustrates how the screen of FIG. 2 is constructed so as to be managed by the CAD system 11. That is, what FIG. 3 shows is an example of vector data which is transmitted by the CAD system 11 for processing by the vector interface 21. The data in FIG. 3 are sorted in ascending order by the items of coordinate 1 therein. That is, the data in FIG. 3 are sorted by item "x" of coordinate 1, followed by item "y" thereof. FIG. 3 also contains attribute items, figure attribute items, coordinate 2 items, and value items. The vector data shown in FIG. 3 comprise, from the top downwards, numeric code data indicating the crosswise length of the figures (a circle, a rectangle and another circle) in the drawing of FIG. 2; continuous line data representing a circle, a crosswise straight line, a rectangle, another crosswise straight line and another circle; code data indicating character information in the format information shown in the bottom right corner of the drawing; continuous line data denoting the rightmost circle in the drawing; code data showing a "joining part" in the drawing; and numeric code data indicating the lengthwise length of the figures in the drawing.

Figure 5:
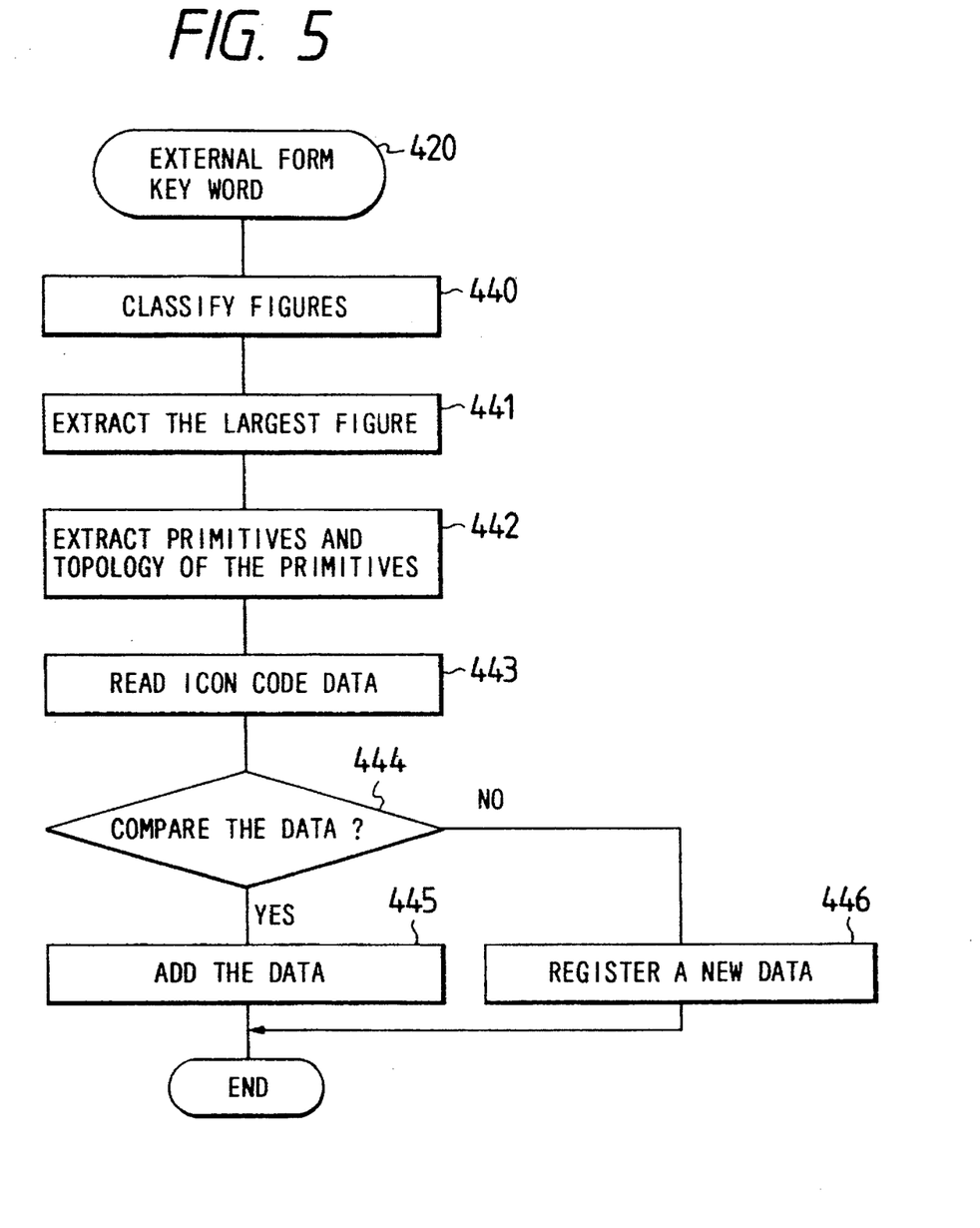
FIG. 5 is a flowchart specifically indicating how external form key-words are extracted in the operational flow of FIG. 4.

Referring now to FIGS. 4 and 5, there will be described how key-words are extracted when image data is registered by this embodiment. In the flow of FIG. 4, step 401 is a process in which a file name is extracted in the form of vector data and established as a key-word. The drawing of FIG. 2 generated by the CAD system 11 for the electronic filing system 13 is registered therein. For use with a registering command, both a source file name and a destination file name are required as in the case of file transfer. The destination file name is a key-word that is required by the electronic filing system 13. The source and destination file names may be one and the same. The destination file name is the first data to be received by the vector interface 21 when image data are to be registered. A destination file name becomes a key-word when stored by the controller 25 into the KR 24.

In step 402, the vector interface 21 receives the vector data of FIG. 3 from the CAD system 11.

In step 403, a check is made to see if the transfer data have been exhausted. If there are still data to be transferred, step 404 is reached; if there are no more data to be transferred, step 420 is reached.

In each of steps 404, 405 and 406, a check is made to judge the attribute of the data. The attribute to be judged is among those shown in FIG. 3. If a character attribute is found, step 407 is reached; if a numeric attribute is detected, step 409 is reached; if a continuous line attribute is encountered, step 411 is reached; otherwise step 412 is reached.

In steps 407 and 408, key-words are extracted according to format information. Format information is a kind of information comprising positional information about characters such as those which are written in the box 31 of FIG. 2 and which indicate the drawing to be registered. In the format information, key-words may be any of character strings 32 through 36 in FIG. 2.

In step 407, a check is made to see if the character coordinates fall within the coordinate range delimited by the box 31 of FIG. 2 being in the bottom rightmost position. If the character coordinates are found within the range, step 408 is reached in which the character string codes of the value items in FIG. 3 are taken and stored in the KR 24. If the character coordinates are out of the range, step 412 is reached. Step 412 is also reached when step 408 has come to an end.

In step 408, character attribute key-words such as "YAMADA," "OHTA" and "JOINING PART" in FIG. 2 are extracted and stored in the KR 24.

In steps 409 and 410, the maximum sizes in both the X and the Y direction of the graphic form 37 in FIG. 2 are found from the corresponding numeric data and are used as key-words. In step 409, a check is made to see if any of the value items in FIG. 3 is larger than the maximum sizes found. For calculation, a work area is set aside in the KR 24 and an initial value of 0 is set thereto. Comparisons are made consecutively with the values of numeric attribute data. If a data value is greater than the value in the work area of the KR 24, step 410 is reached. In step 410, the current value in the work area of the KR 24 is replaced by the data value. This process is carried out in both the X and the Y direction. At the end of data transfer, the current value in the work area of the KR 24 is the maximum value which was searched for and is set as the key-word. Step 410 is the process in which the key-words are extracted. If the target data is not the last data in step 409, termination of step 410 is followed by step 412 which is a data conversion process.

In step 411, all continuous line attribute data selected in step 406 are stored consecutively into the KR 24. The data are used later in step 420 in which an external form key-word process is carried out.

Figure 8:
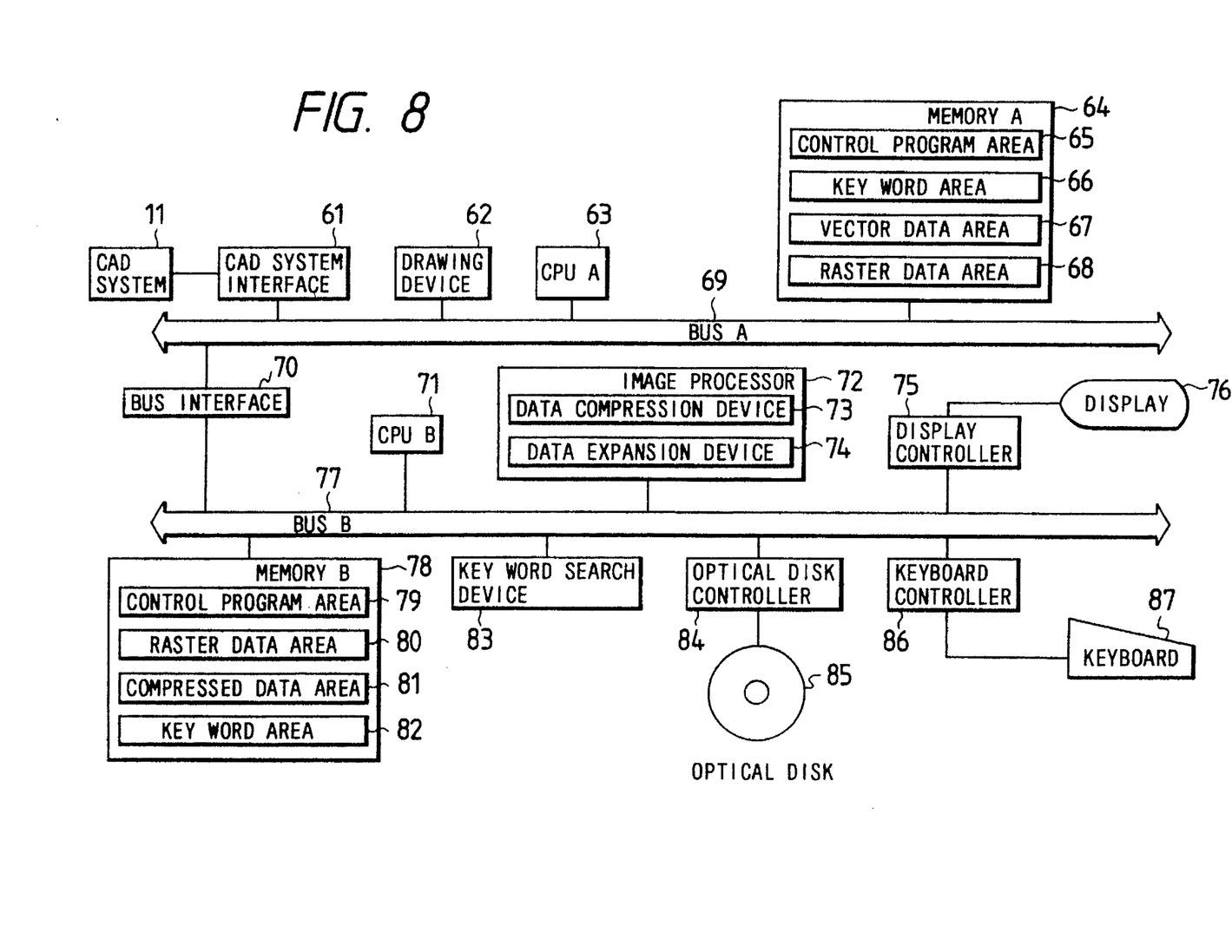
FIG. 8 is a block diagram depicting an embodiment of a system for registering and searching for image data according to the present invention.

In step 412, the vector data that were sent in are converted to raster data. The DR 22 in FIG. 1 are a bit map memory. For this reason, the controller 25 analyzes the vector data that were input via the vector interface 21 and writes them as raster data to suitable locations in the DR 22. Details of the processing involved are better understood by referring to FIG. 8 depicting a typical system according to the present invention.

With the end of input data detected in step 403, all the input data have been placed in the DR 22 as raster data, together with the key-words required.

Step 420 is the process in which external form key-words are extracted from the continuous line attribute data mentioned above. An example of this process is described below by referring to the flowchart of FIG. 5. In step 440 of FIG. 5, the vector data of the continuous line attribute are classified into unit figures. Typically, the data are stored in the DR 24 in the order in which they were found in step 411. Thus the data are read from the KR 24 in that order, and a check is made to see if one piece of data has a point of contact with the next piece of data. All vector data of the continuous line attribute stored in the KR 24 are examined and classified.

In process 441, a check is made on the vector data stored in step 440 for any point of contact. As a result, the vector data are classified in units of at least one figure. The area of each classified figure is calculated so that the largest figure is found. Of the figures shown in FIG. 2, the largest turns out to be the figure 37 as a result of the calculation. Thus the figure 37 found and retrieved in step 441 as the largest figure.

In step 442, the primitives making up the figure and the topology interconnecting these primitives are extracted. In this context, a primitive is a basic graphic element which constitutes a figure and which cannot be reduced further, such as a circle, a rectangle or a triangle. From the vector data constituting the figure 37 in FIG. 2 detected in step 441, graphic attributes are extracted in the order in which they were found in step 411. This provides extraction of the primitives that make up the figure. The topology thereof is acquired by adding relational symbols of positional information (called auxiliary information) to the extracted primitives. In this manner, the primitives made up of a circle, a rectangle and a circle are extracted, in that order. Auxiliary information made up of relational symbols (FIG. 6A) in the X direction is placed between the primitives. These symbols are used as key-words indicating the primitives and the topology thereof. The extracted key-words are stored in the KR 24.

Figure 6A:
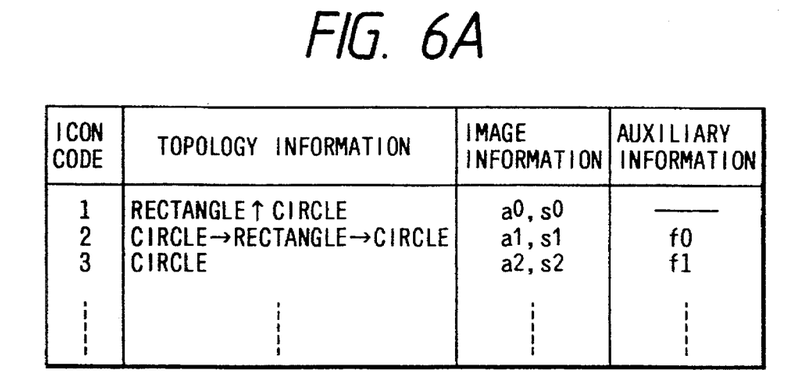
FIG. 6A is a view denoting a data structure of icon codes mentioned in FIG. 5.
Figure 6B:
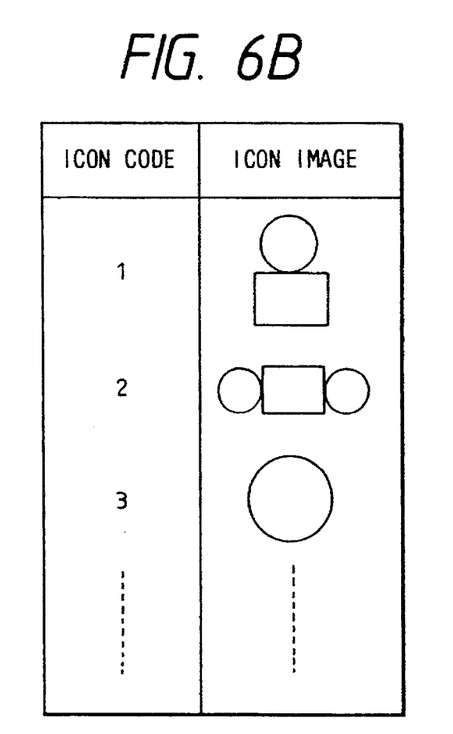
FIG. 6B is a view showing icon images that correspond to the icon codes given in FIG. 6A.

Step 443 is then reached so as to extract icon codes, the last of the key-words. In this step, the data shown in FIG. 6A are sent by the electronic filing system 13 (FIG. 1) via the raster interface 23 to the KR 24. The data thus stored in the KR 24 illustratively constitute a data structure table of icon codes that the electronic filing system 13 initially possesses. FIG. 6B depicts the icon images that correspond to the data in FIG. 6A.

In step 444, a comparison is made between the topology information of FIG. 6A read in step 443 and the topology data detected in step 442. If there is found any matching icon code, step 445 is reached; if no matching icon code is detected, step 446 is reached.

Where a matching icon code exists and step 445 is reached accordingly, the icon code is associated with the corresponding image data and is stored temporarily in the KR 24.

If no matching icon code is found, an icon code is generated anew in step 446. An expansion factor by which the corresponding figure is reduced is obtained first. Then the continuous line attribute vector data stored after classification and extraction are converted to raster data by the expansion factor obtained, the raster data making up an icon image to be stored in the KR 24. A new icon code is generated and added to the image. Termination of step 445 or 446 is followed by step 421 in FIG. 4.

After the process flow described above, there are stored in the KR 24 the key-words corresponding to five attributes: file name, characters, numeric value, primitives and the topology thereof, and icon code.

In step 421, the raster data after conversion are transferred from the DR 22 via the raster interface 23 to the electronic filing system 13. After the transfer, step 422 is reached.

In step 442, the key-words stored in the KR 24 are sent via the raster interface 23 to the electronic filing system 13. Meanwhile, a key-word selection code has been added to a command by which to register images from the CAD system 11 to the electronic filing system 13. That is, the registration command comprises a source file name, destination file name and a key-word selection code. In step 422, the key-word selection code is analyzed and suitable key-words are selected accordingly for transmission to the electronic filing system 13.

With the above-described embodiment, five types of key-words are generated in a single pass of processing. However, the present invention is not limited to the use of these five key-words. As required, one or a plurality of key-words may be generated for each drawing. Needless to say, these alternative features are also controlled by the control program of the controller 22.

Where only one type of key-words is used so that all generated key-words are registered, there is obviously no need for the key-word selection code mentioned above.

Figure 7:
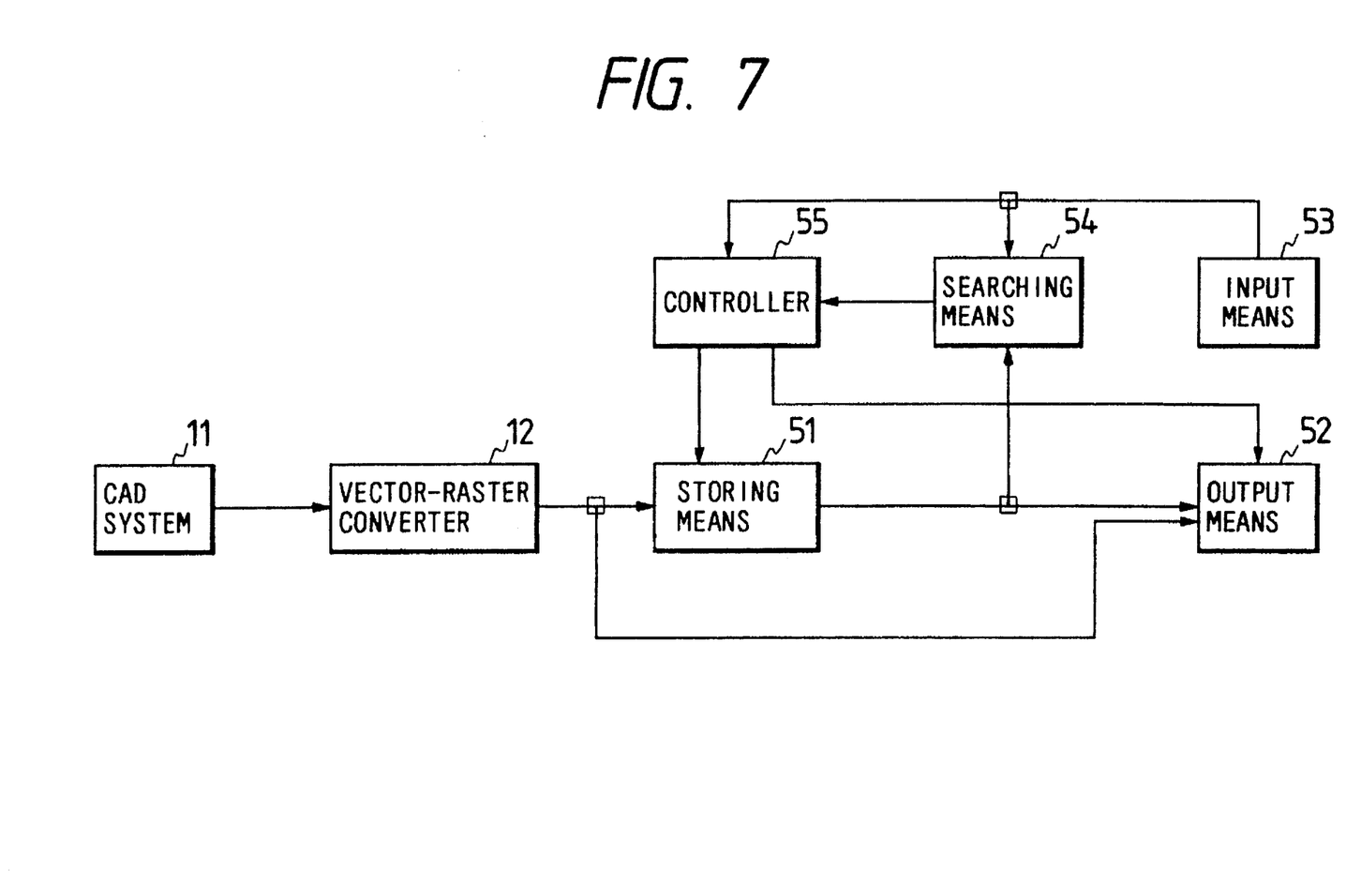
FIG. 7 is a schematic block diagram illustrating an embodiment of a system for searching image data for desired parts thereof according to the present invention.

Referring now to FIG. 7, there will be described an embodiment of a searching method for use in the filing system according to the present invention. FIG. 7 is a schematic block diagram of a system for image data search according to the invention. In this figure, a storing means 51 receives raster data (image data) and key-words from the vector-raster converter 12 for storage therein. That is, the storing means 51 is equivalent to the electronic filing system 13 of FIG. 1. In accordance with commands from a controller 55, raster data and key-words are selectively read from the stored data and are sent to an output means 52, while only the key-words are transferred to a searching means 54. According to signals from the controller 55, the output means 52 displays or otherwise outputs either the key-words from the vector-raster converter 12 or the key-words and raster data from the storing means 51. An input means 53 sends key-words to be searched for to the searching means 54 according to instructions from the operator. Furthermore, the input means sends to the controller 55 a process mode command specifying any of the following three modes: a mode in which the key-words extracted by the vector-raster converter 12 are displayed upon registration; a mode in which a list of the key-words stored in the storing means 51 is displayed during search; or a mode in which the raster data stored in the storing means 51 are displayed. Upon receipt of the key-words from the storing means 51, the searching means 54 searches them for the key-words given by the input means 53, and accordingly transmits to the controller 55 the information about the address location where the data exist. Following the process mode command from the input means 53, the controller 55 tells the output means 52 which of the key-words and/or data are to be displayed: key-words from the vector-raster converter 12, key-words from the storing means 51, or raster data from the storing means 51. At the same time, the controller 55 receives search information from the searching means 54, and accordingly sends a signal to the storing means 51 so that the raster data corresponding to the search information received are transmitted to the output means 52.

What follows is a description of how the searching method according to the invention is typically practiced in the case where the operator knows all registered key-words during the search and directly inputs desired key-words.

Key-words are extracted automatically by the vector-raster converter 12. Thus during image data registration, the input means 53 tells the controller 55 using a command to display on the output means 52 the key-words extracted by the vector-raster converter 12. This allows the operator to know all key-words before the registration is terminated. During search, the input means 53 tells the controller 55 using a signal to output the key-words from the storing means 51 to the searching means 54. Then the operator inputs desired key-words from the input means 53. The key-words are sent to the searching means 54. The search information acquired by the searching means 54 is transferred to the controller 55. In turn, the controller 55 transmits the search information to the storing means 51 so that the latter sends the raster data corresponding to the information to the output means 52. The above processing makes it possible for the operator to input desired key-words directly and to have the output means 52 display, print or otherwise outpost the image data corresponding to these key-words.

Below is a description of how the searching method according to the invention is illustratively practiced in the case where the operator, not knowing the key-words registered, gets these key-words displayed and selects for input any of them on the display screen.

During search, the input means 53 tells the controller 55 using a command to send the key-words from the storing means 51 to both the output means 52 and the searching means 54. The output means 52 displays or otherwise outputs the received key-words so that the operator gets to know these key-words. In response, the operator selects desired key-words and inputs selected contents from the input means 53. The key-words and the selected contents are sent to the searching means 54. The searching means 54 generates search information based on the key-words and the suitably selected contents both previously received, and forwards the information to the controller 55. The controller 55 sends the search information to the storing means 51 so that the latter transmits the raster data corresponding to the information to the output means 52. These processes allow the operator to select desired key-words and to have the images corresponding thereto displayed, printed or otherwise output on the output device 52.

Referring now to FIG. 8, there will be described a typical configuration of the system according to the invention. Specifically, FIG. 8 shows how a system embodying the registering and searching method according to the invention is illustratively practiced. The CAD system 11 generates vector data for a target drawing, and sends the data to a CAD system interface 61. The CAD system interface 61, equivalent to the vector interface 21 in FIG. 1, accepts the vector data from the CAD system 11 and converts them to the data whose data format is compatible with a bus A 69. The converted data are sent to a vector data area 67 in a memory A 64 for storage via the bus A 69. A drawing device 62, equivalent to part of the controller 25 in FIG. 1, reads the vector data from the vector data area 67 of the memory A 64 via the bus A 69, and stores the data into a raster data area 68 of the same memory. Typically, the device may be an LSI, e.g., HD63484 (ACRTC) from Hitachi, Ltd.

A CPU A 63 and a control program area 65 of the memory A 64 correspond to the rest of the controller 25 in FIG. 1. The CPU A 63 extracts key-words in accordance with the program stored in the control program area 65 of the memory A 64 so as to control all devices connected to the bus A 69. How the CPU A 63 extracts key-words is outlined by the flowcharts in FIGS. 4 and 5. In operation, the CPU A 63 extracts data for use as key-words from the vector data stored in the vector data area 67 of the memory A 64, and stores the data in a key-word area 66 of the same memory. The icon code information table shown in FIG. 6 is stored in the key-word area 66 of the memory A 64. From the key-word area 66 of the memory A 64, the CPU A 63 reads icon code information, executes steps 443 through 446 in FIG. 5 accordingly, and stores the acquired key-words in the key-word area 66 of the same memory. Typically, the CPU A 63 may be an LSI, e.g., a general-purpose processor 80286 from Intel Inc.

The memory A 64 comprises the control program area 65, key-word area 66, vector data area 67 and raster data area 68. The control program area, equivalent to the controller 25 in FIG. 1, contains programs for executing the flows of processes depicted in FIGS. 4 and 5. The key-word area 66, equivalent to the key-word RAM 24 in FIG. 1, stores the key-words extracted by the CPU A 63 as well as the icon code information table shown in FIG. 6. The vector data area 67 and raster data area 68, equivalent to the data conversion RAM 22 in FIG. 1, store respectively the vector data of drawings generated by the CAD system 11 and the raster data after conversion. The bus A 69 is a signal conductor that implements data exchanges between the configured devices.

A bus interface 70, equivalent to the raster interface 23 in FIG. 1, converts data between the bus A 69 and a bus B 77 for data exchange.

A CPU B 71 controls all devices connected to the bus B 77 in accordance with the programs stored in a control program area 79 of a memory B 78. During search, the CPU B 71 plays the role of the controller 55 in FIG. 7. In accordance with instructions entered by the operator from a keyboard 87 via a keyboard controller 86, the CPU B 71 controls the entire system so that the information requested by the operator is outpost on an output means such as a display 76. Typically, the CPU B 71 may be an LSI, e.g., a general-purpose processor 80286 from Intel Inc.

An image processor 72 mainly comprises a data compression device 73 and a data expansion device 74. Large amounts of data need to be stored on optical disks 85. This is accomplished as follows: The data compression device 73 reads the raster data from a raster data area 80 of the memory B 78. After compressing the data, the data compression device 73 stores them in a compression data area 81 of the memory B 78. For display, the compressed data are to be expanded to the initial format of raster data that may be displayed. This is accomplished as follows: The data expansion device 74 reads the data from the compression data area 81 of the memory B 78, expands them to the initial raster data, and places the expanded data in the raster data area 80 of the same memory. Typically, the image processor 72 may be an LSI, e.g., HD63085 (DICEP) from Hitachi, Ltd.

The display controller 75, equivalent to the output means 52 in FIG. 7 and under control by the CPU B 71, selects any of the raster data from the raster data area 80 of the memory B 78, the key-words from the key-word area 82, or the key-words recorded on the optical disks 85 for output on the display 76.

The memory B 78 comprises the control program area 79, raster data area 80, compressed data area 81, and key-word area 82. The control program area 79 corresponds to part of the controller 55 in FIG. 7 and stores programs for the CPU B 71. The raster data area 80 stores the raster data coming from the raster data area 68 of the memory A 64 via the bus interface 70. The raster data area 80 also stores the raster data that were expanded by the data expansion device 74 in the image processor 72. The stored raster data are either read into the data compression device 73 in the image processor 72 for compression, or sent to the display controller 75 for display. The compressed data area 81 stores the data generated by the data compression device 73 in the image processor 72. Having been stored, the compressed data are either read into the data expansion device 74 in the image processor 72 for expansion, or sent to an optical disk controller 84 for storage. The key-word area 82 stores the key-words that were extracted by the CPU A 63, placed the key-word area 66 of the memory A 64, and forwarded via the bus interface 70. In addition, the key-word area 82 stores the key-words that were input by the operator from the keyboard 87 and forwarded via the keyboard controller 86. The stored key-words are either read into the optical controller 84 for storage onto the optical disks 85, or sent to a key-word search device 83 for search purposes.

The key-word search device 83, equivalent to the searching means 54 in FIG. 7, searches large amounts of key-words in the key-word area 72 of the memory B 78 or on the optical disks 85 for the specific key-words that were input from the keyboard 87 and stored in the key-word area 82 of the same memory. Typically, the key-word search device may be an IC, i.e., Am95C85 (CADH) for search purposes from AMD Inc.

The optical disk controller 84 and the optical disks 85 are equivalent to the storing means 51 in FIG. 7. The optical disk controller 84 reads both the image data from the compressed data area 81 of the memory B 78 and the key-words from the key-word area 82 thereof for storage onto the optical disks 85. Conversely, the controller 84 may read image data and/or key-words from the optical disks 85 for storage into the memory B 78. The optical disks 85 are a recording medium by which to store image data and key-words. In General, key-words are stored in what is usually called an index area or directory area on the disk. The index or directory area is either stored together with the corresponding image data, or set aside for separate storage in a specific portion on the disk.

The keyboard controller 86 and the keyboard 87 are equivalent to the input means 53 in FIG. 7. When the operator inputs key-words or the like from the keyboard 87, the keyboard controller 86 sends the input contents to both the CPU B 71 and the key-word area 82 of the memory B 78. The bus B 77 is a signal conductor that implements data exchanges between the devices connected thereto.

The foregoing system configuration implements in the manner described the registering and searching method according to the present invention.

The embodiments described so far have utilized a CAD system in connection with the vector data input means. However, it is to be understood that the present invention is not limited to the use of a CAD system. As indicated, the vector data for use by the CAD system comprise data representing figures generated; code data such as characters, numerals and information constituting drawing format information; and code data such as a source file name and a destination file name. A mainframe computer may store character codes by developing them into character font patterns, regarding the character codes to be output to a printer as vector data solely comprising character information. In that case, the electronic filing system according to the invention may be connected to the mainframe for output to its printer. Where the vector data generated by some suitable means are stored on a floppy disk, magnetic tape or some other storage medium, the electronic filing system may be connected to a device capable of reading such storage medium. In addition, where the vector data which are of the nature described above and which are generated by some suitable means are placed on a transmission line, the electronic filing system may be connected to a device interfacing with that transmission line.

As described, according to the present invention, vector data generated by a CAD system or the like are converted to image data for use by an electronic filing system. During the conversion, character key-words are automatically extracted from the vector data. This makes it possible to save man-hours significantly in registering image data at high speed into the electronic filing system.

According to the invention, it is also possible to extract as key-words external form patterns that draw the operator's attention more than character type key-words. This feature considerably improves the ease of handling the man-machine interface during search operations.

Overall, the present invention eliminates the biggest bottleneck that has ever been experienced in generating key-words in prior art electronic filing systems. That is, the greatly enhanced ease of key-word generation is a significant improvement in practicing the art of electronic filing and registering of image data.

What is claimed is:

1. A registering method of registering image data of figures into an electronic filing system having means for storing the image data and corresponding key-words thereof, means for searching the image data stored in the storing means in response to one of the key-words, and means for outputting the image data searched by the searching means, comprising the steps of:

receiving vector data of the figures to be stored;

converting said vector data into the image data of the figures; and producing each of the corresponding key-words of the image data by extracting data corresponding to an indicated attribute from said vector data received in said receiving step.

2. The registering method according to claim 1, wherein:

said indicated attribute is a file name of said vector data, so that file name data is extracted as said corresponding key-words from said vector data in response to said indicated attribute in said producing step.

3. The registering method according to claim 1, wherein:

said indicated attribute is title information of said vector data, so that title information data is extracted as said corresponding key-words from said vector data in response to said indicated attribute in said producing step.

4. The registering method according to claim 1, wherein:

said indicated attribute is a maximum length value of the figures, so that maximum length data of said vector data is extracted as said corresponding key-words from said vector data in response to said indicated attribute in said producing step.

5. The registering method according to claim 1, wherein:

said indicated attribute is a primitive/topology of the figures, so that data of primitive elements or topology of said primitive elements is extracted from said vector data in response to said indicated attribute in said producing step.

6. The registering method according to claim 1, wherein:

said indicated attribute is an icon code, so that icon code data is extracted from said vector data in response to said indicated attribute by obtaining continuous line data from said vector data and reducing said continuous line data in said producing step.

7. A method for searching image data of figures being defined by vector data stored in an electronic filing means of an image filing system, in which the electronic filing means stores the image data of the figures, comprising the steps of:

selecting one of key-words, each of said key-words being produced by extracting attribute data from the vector data stored in the electronic filing means in response to an indicated attribute and being stored in the electronic filing means;

searching the image data in the electronic filing means in response to said selected key-word; and outputting the image data corresponding to said selected key-word searched by said searching step.

8. A filing apparatus for filing image data corresponding to figures to be registered having means for storing the image data with a key-word corresponding to each of the image data, means for searching the image data stored in the storing means by using the key-word, and means for outputting the image data searched by the searching means, comprising:

receiving means for receiving vector data corresponding to the figures to be registered;

converting means for converting said vector data received by said receiving means into the image data to be stored in the storing means; and generating means for generating the key-word to be stored with the image data by extracting data corresponding to at least one predetermined attribute from the vector data received by the receiving means.

9. The filing apparatus according to claim 8, wherein:

said generating means generates the key-word by extracting title information of said vector data as said data corresponding to said predetermined attribute.

10. The filing apparatus according to claim 8, wherein:

said generating means generates the key-word by extracting a maximum length value of the figures as said data corresponding to said predetermined attribute.

11. The filing apparatus according to claim 8, wherein:

said generating means generates the key-word by extracting one of primitive elements included in the figures or a topology of a plurality of said primitive elements as said data corresponding to said predetermined attribute.

12. The filing apparatus according to claim 8, wherein:

said generating means generates the key-word by extracting continuous line information from said vector data as said data corresponding to said predetermined attribute and reducing said continuous line information so as to produce an icon image of an icon code, which is used as the key-word.

13. The filing apparatus according to claim 12, wherein:

said icon code is stored in an icon code table of said storing means as a reference icon code.

14. An image filing apparatus for registering/searching image data corresponding to vector data of figures generated by a computer aided design system including means for registering the image data in an electronic filing means with a key-word corresponding to each of the image data, means for searching the image data registered in the electronic filing means in response to the key-word, and means for outputting the image data searched by the searching means in a display means, comprising:

receiving means for receiving the vector data of the figures to be registered from the computer aided design system;

converting for converting the vector data received by said receiving means into the image data to be stored in the electronic filing means; and generating means for generating the key-word to be registered with the image data by extracting data corresponding to at least one predetermined attribute from the vector data received by the receiving means.

15. The image filing apparatus according to claim 14, wherein:

said generating means includes means for extracting a plurality of attribute data from the vector data and means for selecting the data corresponding to said predetermined attribute from a plurality of said attribute data.

* * * * *